(12) United States Patent
Tokuda

(10) Patent No.: US 9,955,032 B2
(45) Date of Patent: Apr. 24, 2018

(54) SCANNER CAPABLE OF READING DOUBLE SIDES OF SHEET ONCE

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Satoshi Tokuda, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 28 days.

(21) Appl. No.: 14/964,723

(22) Filed: Dec. 10, 2015

(65) Prior Publication Data

US 2017/0171422 A1 Jun. 15, 2017

(51) Int. Cl.
| | |
|---|---|
| H04N 1/203 | (2006.01) |
| G06K 15/02 | (2006.01) |
| H04N 1/00 | (2006.01) |
| H04N 1/04 | (2006.01) |
| H04N 1/21 | (2006.01) |
| H04N 1/32 | (2006.01) |

(52) U.S. Cl.
CPC ........... *H04N 1/2032* (2013.01); *G06K 15/02* (2013.01); *H04N 1/00244* (2013.01); *H04N 1/00326* (2013.01); *H04N 1/00371* (2013.01); *H04N 1/00594* (2013.01); *H04N 1/0461* (2013.01); *H04N 1/203* (2013.01); *H04N 1/2034* (2013.01); *H04N 1/2108* (2013.01); *H04N 1/32144* (2013.01); *H04N 2201/0094* (2013.01); *H04N 2201/0454* (2013.01)

(58) Field of Classification Search
CPC .... H04N 1/203; H04N 1/2032; H04N 1/2108; H04N 2201/0094
USPC .......................... 358/1.9, 3.26, 505, 514, 408
See application file for complete search history.

(56) References Cited

U.S. PATENT DOCUMENTS

| | | | |
|---|---|---|---|
| 2003/0164991 A1 | 9/2003 | Matsui | |
| 2003/0226885 A1* | 12/2003 | Harris | H04N 1/32112 235/375 |
| 2005/0071738 A1 | 3/2005 | Park et al. | |
| 2005/0157934 A1* | 7/2005 | Tanabe | H04N 19/70 382/232 |
| 2006/0271936 A1* | 11/2006 | Matsuda | G06F 17/30893 718/102 |
| 2008/0231912 A1* | 9/2008 | Murakata | H04N 1/00872 358/474 |
| 2012/0120432 A1 | 5/2012 | Hirohata et al. | |
| 2013/0057928 A1* | 3/2013 | Suzuki | H04N 1/00204 358/474 |
| 2013/0182278 A1 | 7/2013 | Tokuda | |

(Continued)

FOREIGN PATENT DOCUMENTS

JP 2007-311880 11/2007

*Primary Examiner* — Jamares Q Washington
(74) *Attorney, Agent, or Firm* — Amin, Turocy & Watson LLP; Gregory Turocy

(57) ABSTRACT

Generally, a scanner of the present embodiment, which reads a first surface with a first reading section configured to read the first surface of a sheet and a second surface with a second reading section configured to read the second surface opposite to the first surface of the sheet, executes individual processing on a first reading image of the first surface and a second reading image of the second surface.

8 Claims, 6 Drawing Sheets

(56) References Cited

U.S. PATENT DOCUMENTS

2015/0242719 A1\* 8/2015 Kashiwagi ......... H04N 1/32464
  358/1.12
2015/0288845 A1  10/2015 Hirose et al.

\* cited by examiner

SCANNER CAPABLE OF READING DOUBLE SIDES OF SHEET ONCE

FIELD

Embodiments described herein generally relate to a technology for processing reading images on double sides of a sheet.

BACKGROUND

Conventionally, a scanner is generally used to read double sides of a sheet to create image files constituted by images on double sides of the sheet.

A scanner is generally used to read a single side or double sides of a sheet to send image files which are constituted by images on the single side or double sides of the sheet to a preset address.

A scanner is generally used to read a single side of a sheet, carry out an OCR (Optical Character Recognition) for an image on the single side and detect an address. The scanner sends an image file constituted by the image on the single side of the sheet to the address.

A scanner is generally used to read a single side of a sheet and stop a sending processing or a printing processing on an image file constituted by an image on the single side if a ground tint indicating forbiddance of processing on the image is detected.

The requests of a user for a scanner are diverse. In a case of reading double sides of a sheet, more diverse methods for processing a reading image are required.

DETAILED DESCRIPTION

Generally, a scanner of the present embodiment, which reads a first surface with a first reading section configured to read the first surface of a sheet and a second surface with a second reading section configured to read the second surface opposite to the first surface of the sheet, executes individual processing on a first reading image of the first surface and a second reading image of the second surface.

Hereinafter, the embodiment is described with reference to the accompanying drawings.

Figure 1:
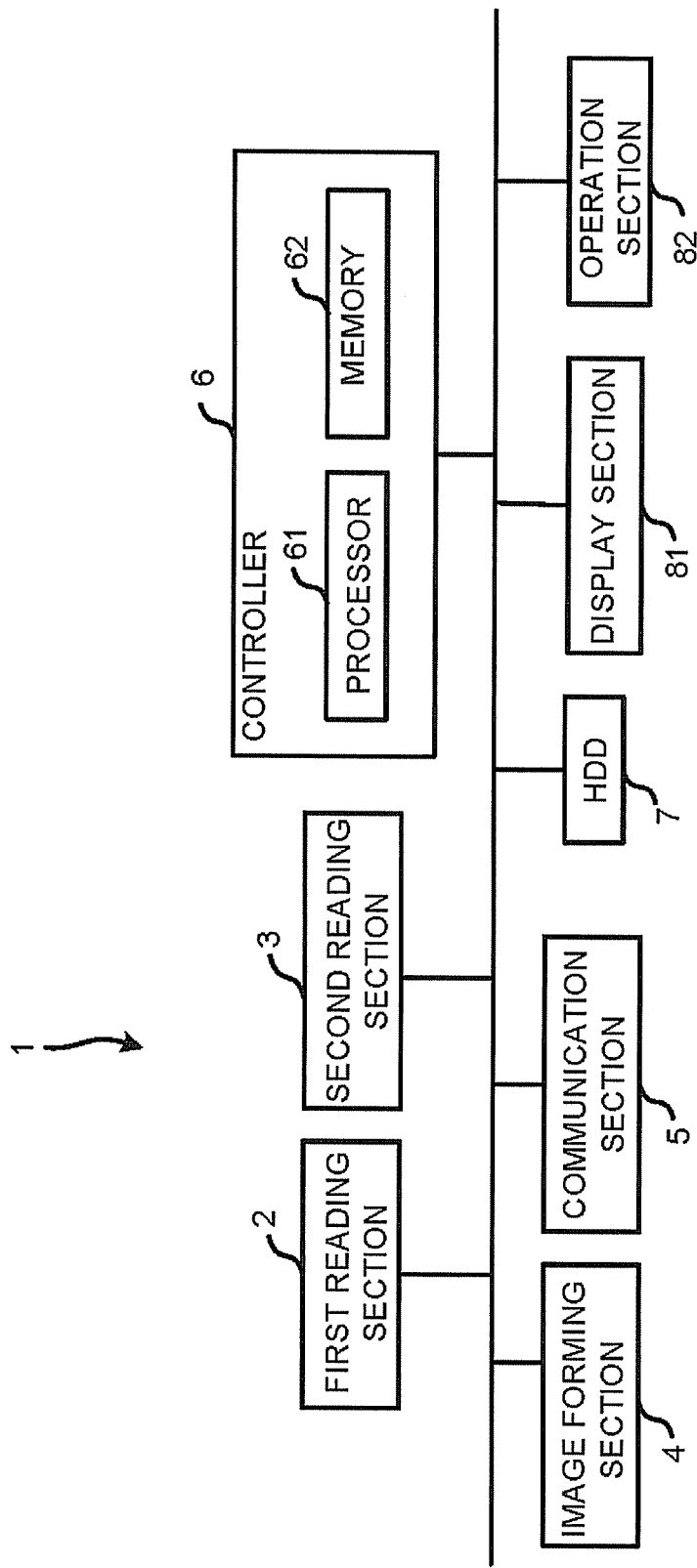
FIG. 1 is a diagram illustrating a constitution of an image forming apparatus.

FIG. 1 is a diagram illustrating a constitution of an image forming apparatus 1 (scanner).

The image forming apparatus 1 is an MFP (Multi-Function Peripheral) which has a copy function, a printing function, a scanning function, a FAX function, an Email sending function and the like. The image forming apparatus 1 comprises a first reading section 2, a second reading section 3, an image forming section 4, a communication section 5, a controller 6, a HDD 7 (Hard Disk Drive), a display section 81 and an operation section 82.

Figure 2:
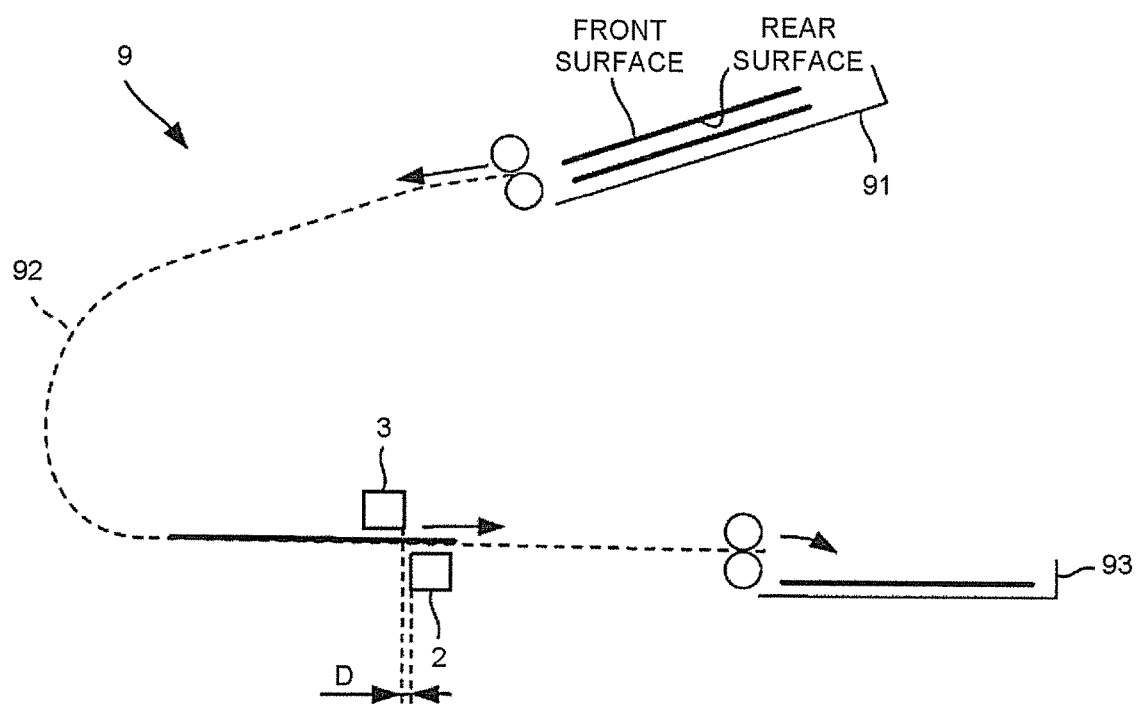
FIG. 2 is a diagram illustrating a first reading section and a second reading section.

FIG. 2 is a diagram illustrating the first reading section 2 and the second reading section 3.

The first reading section 2 and the second reading section 3 are arranged inside an ADF 9 (Auto Document Feeder).

The ADF 9 feeds a sheet from a sheet feeding tray 91 to a conveyance path 92 inside the ADF 9. The ADF 9 discharges the sheet to a sheet discharging tray 93 after images on double sides of the sheet are read by the first reading section 2 and the second reading section 3.

A space D between the first reading section 2 and the second reading section 3 in the conveyance direction of the sheet is shorter than a length of the sheet in the conveyance direction. The sheet which specifies a maximum space D is a sheet having the smallest size among the sheets subjected to a reading operation. For example, the maximum space D is 140 mm which is a length in the conveyance direction of a sheet having a size of an STMT (Statement Half Letter).

As the space D between the first reading section 2 and the second reading section 3 in the conveyance direction is shorter than the length of the sheet in the conveyance direction, the first reading section 2 and the second reading section 3 can read double sides of the sheet simultaneously. Hereinafter, in a case of reading double sides of the sheet with the first reading section 2 and the second reading section 3, it is usually described that double sides of the sheet are read by the first reading section 2 and the second reading section 3 simultaneously.

The first reading section 2 reads a front surface (a first surface) of the sheet on the sheet feeding tray 91. The front surface of the sheet refers to the upper surface of the sheet on the sheet feeding tray 91. The rear surface of the sheet refers to the lower surface of the sheet on the sheet feeding tray 91.

The second reading section 3 reads the rear surface (a second surface) of the sheet on the sheet feeding tray 91.

The first reading section 2 and the second reading section 3 may be a CIS (Contact Image Sensor) or a CCD (Charge Coupled Device).

Return to FIG. 1, the image forming section 4 transfers an image on the photoconductive drum onto the sheet with a toner. The image forming system of the image forming section 4 may be an inkjet head system or thermal system in addition to an electrophotographic system.

The communication section 5 is connected with a network in a wired manner or wireless manner. The communication section 5 includes, for example, an NIC (Network Interface Card) to communicate with a client terminal such as a PC via the network.

The controller 6 controls the whole of the image forming apparatus 1.

The controller 6 includes a processor 61 and a memory 62.

The processor 61 reads programs stored in the memory 62 to execute various processing.

The HDD 7 stores reading images of the sheet read by the first reading section 2 and the second reading section 3.

The display section 81 displays setting information and operation status of the image forming apparatus 1, login information and a notification to a user.

The operation section 82 is a touch panel or buttons and keys. The operation section 82 receives an input of the user and an instruction of a functional operation of the image forming apparatus 1 such as a printing instruction and the like.

Figure 3:
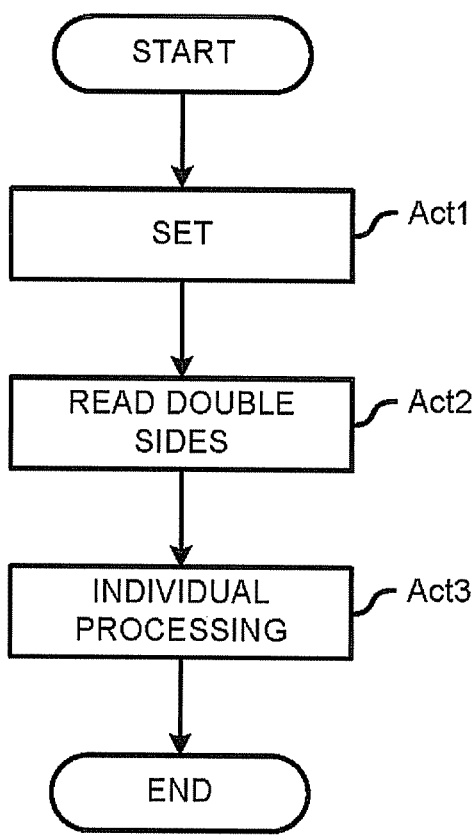
FIG. 3 is a flowchart illustrating procedures of a reading processing carried out by a controller.

FIG. 3 is a flowchart illustrating procedures of a reading processing carried out by the controller 6.

The controller 6 receives selection and various settings of processing to be executed (Act 1).

The controller 6 reads the front surface and the rear surface of the sheet with the first reading section 2 and the second reading section 3 (Act 2).

The controller 6 carries out individual processing on the first reading image of the front surface and the second reading image of the rear surface (Act 3).

Hereinafter, each individual processing is described in detail.

(Email Sending Processing+Storage Processing)

Figure 4:
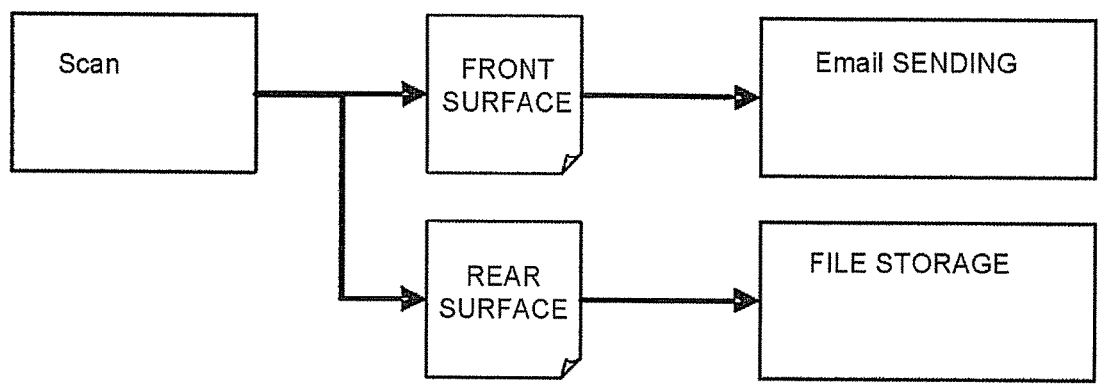
FIG. 4 is a diagram illustrating an Email sending processing and a storage processing.

FIG. 4 is a diagram illustrating an Email sending processing and a storage processing.

First, the controller 6 receives a selection of the Email sending processing on a menu screen displayed by the display section 81.

The controller 6 receives a selection of double-side reading on a setting screen of the Email sending processing. The controller 6 receives a selection of sending one of reading images on the front surface and the rear surface as attached files of the Email, a selection of a sending destination and a selection of a format (e.g. PDF (Portable Document Format) or TIFF (Tagged Image File Format)) of attached files on setting screen of the double-side reading in the email sending processing. The controller 6 is assumed to receive the sending of the front surface. The controller 6 may receive the address of the sending destination through the input on the operation section 82.

The controller 6 receives a selection of processing (a printing processing, an Email sending processing, a Fax sending processing and a Box storage processing) on the rear surface which is not sent on the setting screen. The controller 6 is assumed to receive the Box storage processing. The controller 6 receives a selection of storage destination of the second file (the file stored in the HDD 7) of the second reading image and a selection of a format (PDF, TIFF and the like) of the file to be stored (Act 1). The Box storage refers to storage of the file in the image forming apparatus 1 (HDD 7).

Further, the controller 6 has a function of web server to supply webpage for the client terminal. The controller 6 may receive each setting of double-side reading in the Email sending processing through the webpage. The controller 6 may receive settings of each processing described later through the webpage.

The user sets an original document on the sheet feeding tray 91 of the ADF 9 in such a manner that the surface subjected to the Email sending processing is on the top.

The controller 6 reads the front surface and the rear surface of the sheet with the first reading section 2 and the second reading section 3 by pressing a 'start' button simultaneously (Act 2).

The controller 6 generates a first file based on the first reading image on the front surface and sends the first file to a determined address by email.

The controller 6 generates a second file based on the second reading image of the rear surface to store the second file in a determined storage destination (Act 3).

The controller 6 executes the Email sending processing of the first reading image on the front surface and the storage processing of the second reading image on the rear surface in parallel.

The controller 6 may read the front surface and the rear surface of each sheet among the plurality of sheets continuously. The controller 6 may generate the first file which contains the first reading image on the front surface of each sheet and does not contain the second reading image on the rear surface of each sheet and the second file which contains the second reading image on the rear surface of each sheet and does not contain the first reading image on the front surface of each sheet. The controller 6 may send the first file by email and store the second file in the storage destination.

Moreover, the controller 6 can receive a selection of a printing processing, an Email sending processing, a Fax sending processing and a Box storage processing as a processing on the first reading image of the front surface, and meanwhile receive a selection of a printing processing, an Email sending processing, a Fax sending processing and a Box storage processing as a processing on the second reading image of the rear surface. The processing on the first reading image and the processing on the second reading image may be identical to or different from each other.

For example, the controller 6 may receive a storage processing on the first reading image of the front surface and a storage processing on the second reading image of the rear surface. Further, the controller 6 reads the front surface and the rear surface of each sheet among the plurality of sheets continuously, and may store the first file only consisting of the first reading image of the front surface and the second file only consisting of the second reading image of the rear surface in the determined storage destination.

(OCR+Sending Storage Processing)

Figure 5:
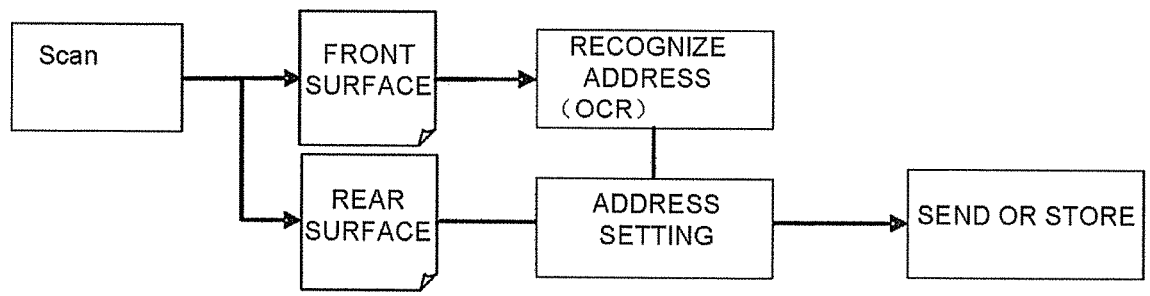
FIG. 5 is a diagram illustrating procedures of an OCR and a sending storage processing.

FIG. 5 is a diagram illustrating procedures of an OCR and a sending storage processing.

The controller 6 receives a selection of the present processing based on the OCR on the menu screen. The controller 6 receives a selection of which one of the front surface and the rear surface to be subjected to the OCR (Act 1). The controller 6 is assumed to receive a selection of the front surface to be subjected to the OCR.

the controller 6 reads the front surface and the rear surface of the sheet with the first reading section 2 and the second reading section 3 through pressing the 'start' button simultaneously (Act 2).

The address of the sending destination of files (address of server, Email address of the client terminal) or Box name (file name in the HDD 7) is recorded as the sending storage destination information on the front surface of the sheet. The sending storage destination information may be character strings or may be one-dimensional or two-dimensional barcode. The sending storage destination information may contain information for designating the format of files.

The controller 6 carries out an OCR processing on the first reading image of the front surface of the sheet to detect the sending storage destination information.

The controller 6 creates, based on the second reading image on the rear surface of the sheet, the second file in a pre-determined format or a format designated by sending storage destination information.

The controller 6 carries out the OCR processing on the first reading image and the creation processing of the second file in parallel.

The controller 6 sends the second file of the second reading image to the address indicated by the sending storage destination information or stores the second file in the storage destination indicated by the sending storage destination information (Act 3).

Further, the controller 6 may carry out an OCR processing on double sides of the sheet to detect the sending storage destination information from either of reading images on double sides. Then, a file is obtained by filing the reading image of one surface the sending storage destination information on which is not detected and may be stored or sent.

(Ground Tint Detection Processing+Forbiddance Processing)

Figure 6:
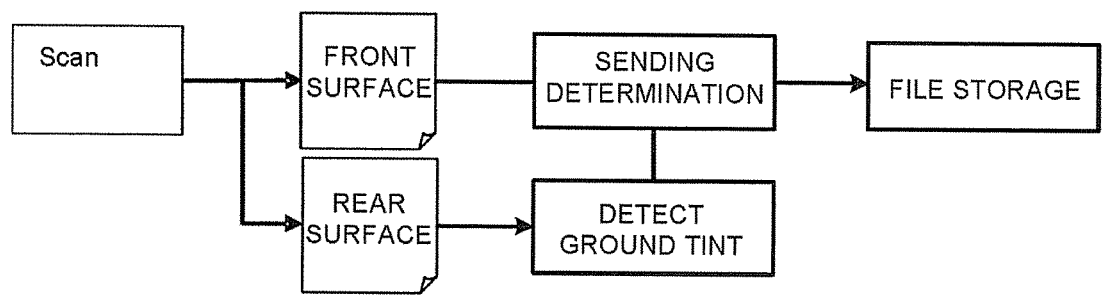
FIG. 6 is a diagram illustrating procedures of a ground tint detection processing and a forbiddance processing.

FIG. 6 is a diagram illustrating procedures of a ground tint detection processing and a forbiddance processing.

The controller 6 receives a setting indicating forbiddance of processing in a case there is a ground tint indicating forbiddance of processing on the single side on the menu screen. The controller 6 receives a selection about the detection of the ground tint on which one of the front surface and the rear surface. The controller 6 is assumed to receive a selection about the detection of the ground tint of the rear surface.

The controller 6 receives a selection of a processing (a printing processing, an Email sending processing or a Fax sending processing) on the front surface. The controller 6 is assumed to receive a selection of the Email sending processing. The controller 6 is assumed to receive a selection on the format of the first file of the first reading image and a selection of a sending destination (Act 1).

The controller 6 reads the front surface and the rear surface of the sheet with the first reading section 2 and the second reading section 3 through pressing the 'start' button simultaneously (Act 2).

The controller 6 creates the first file based on the first reading image of the front surface.

The controller 6 executes a creation processing of the first file and a processing of detecting the ground tint from the second reading image of the rear surface in parallel.

The controller 6 sends the first file to the sending destination if the ground tint is not detected.

The controller 6, if the ground tint is detected, stops and cancels the sending processing of the first file, that is forbids sending processing of the first file (Act 3). The controller 6 forbids the printing processing or the Fax sending processing if the ground tint is detected when the processing on the front surface is the printing or the Fax sending processing.

As stated above, the controller 6 only detects the ground tint on a determined surface of the sheet. However, it is not limited to this; the controller 6 may detect the ground tints on both the first reading image of the surface and the second reading image of the rear surface. Further, the controller 6 may execute a ground tint detection processing on double sides in a case where it is set that different processing is designated on the front surface and the rear surface of the sheet as described in the process of (Email sending processing+storage processing).

As stated above, the controller 6 forbids, if the ground tint is detected, the printing processing, the Email sending processing, the Fax sending processing. However, the controller 6 may forbid the Box storage processing if the ground tint is detected when the Box storage processing is set.

Like the detailed description above, according to the technology described in the embodiment, a technology for processing reading images on the double sides of the sheet is supplied.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A scanner which reads a first surface of a sheet with a first reading section configured to read the first surface of the sheet and a second surface opposite to the first surface of the sheet with a second reading section configured to read the second surface of the sheet, wherein
   the scanner is capable of independently receiving a setting of a first processing on a first reading image of the first surface of each sheet among a plurality of sheets and a setting of a second processing on a second reading image of the second surface of each sheet among the plurality of sheets, and
   the first surface and the second surface of each sheet among the plurality of sheets are read continuously to create the first file which contains the first reading image of each sheet and does not contain the second reading image of each sheet and the second file which contains the second reading image of each sheet and does not contain the first reading image of each sheet, the scanner executes the first processing on the first file and executes the second processing on the second file after reading the first surfaces and the second surfaces of the plurality of sheets.

2. The scanner according to claim 1, wherein
   a space between the first reading section and the second reading section in a conveyance direction of the sheet is shorter than a length of the sheet in the conveyance direction.

3. The scanner according to claim 1, wherein
   an address is detected from one of the first file which contains the first reading images and the second file which contains the second reading images and the other one of the first file and the second file is sent to the address.

4. The scanner according to claim 1, wherein
   if a marker indicating the forbiddance of a processing is detected from one of the first file which contains the first reading images and the second file which contains the second reading images, the processing on the other one of the first file and the second file is forbidden.

5. The scanner according to claim 1, wherein
   a client terminal includes a web server function for supplying a webpage on which setting of the first processing and setting of the second processing are received.

6. The scanner according to claim 1, wherein
   the scanner comprises an image forming section configured to form an image on a sheet; and
   one of the first reading images of the first file and the second reading images of the second file are formed on the sheet with the image forming section.

7. A reading processing by a scanner which comprises a first reading section configured to read a first surface of a sheet and a second reading section configured to read a second surface opposite to the first surface of the sheet, including:
   reading the first surface and the second surface of each sheet among a plurality of sheets continuously with the first reading section and the second reading section;
   creating a first file which contains the first reading image of each sheet and does not contain the second reading image of each sheet and the second file which contains the second reading image of each sheet and does not contain the first reading image of each sheet;

independently receiving a setting of a first processing on a first reading image of the first surface of each sheet among the plurality of sheets and a setting of a second processing on a second reading image of the second surface of each sheet among the plurality of sheets; and executing the first processing on the first reading image and executing the second processing on the second reading image.

8. The reading processing according to claim 7, wherein a space between the first reading section and the second reading section in a conveyance direction of a sheet is shorter than a length of the sheet in the conveyance direction.

\* \* \* \* \*